United States Patent [19]
Hotta et al.

[11] Patent Number: 5,414,470
[45] Date of Patent: May 9, 1995

[54] SYNC SIGNAL GENERATOR FOR GENERATING A SECOND SYNC SIGNAL SYNCHRONIZED WITH A FIRST SYNC SIGNAL

[75] Inventors: Nobutaka Hotta, Fujisawa; Kazuhiro Ooyagi, Yokohama; Keiro Shinkawa, Hiratsuka, all of Japan

[73] Assignees: Hitachi, Ltd.; Hitachi Video Engineering, Incorporated; Hitachi Automotive Engineering Co., Ltd., all of Tokyo, Japan

[21] Appl. No.: 646,434

[22] Filed: Jan. 28, 1991

[30] Foreign Application Priority Data

Jan. 26, 1990 [JP] Japan ................... 2-014959

[51] Int. Cl.6 ............................................. H04N 5/04
[52] U.S. Cl. ..................................... 348/530; 348/536
[58] Field of Search ............... 358/148, 158, 150, 153, 358/188; 455/51.1, 52.1, 54.1, 63, 265, 260, 263, 264, 297, 245; 348/530, 540, 541, 546, 547, 548; H04N 5/04, 5/05, 5/12, 5/08, 5/10

[56] References Cited

U.S. PATENT DOCUMENTS

| 4,025,951 | 5/1977 | Eckenbrecht | 358/158 |
| 4,159,481 | 6/1979 | Mikado | 358/153 |
| 4,729,024 | 3/1988 | Kawai et al. | 358/148 |

FOREIGN PATENT DOCUMENTS 0070878  4/1986  Japan .

*Primary Examiner*—James J. Groody
*Assistant Examiner*—David E. Harvey
*Attorney, Agent, or Firm*—Antonelli, Terry, Stout & Kraus

[57] ABSTRACT

A sync signal generator of a television receiver for use in a vehicle has a phase reset detector for gradually absorbing a phase fluctuation of an input sync signal which occurs due to a ghost phenomenon or a fading phenomenon and reducing a phase fluctuation. The sync signal generator provides a sync signal synchronized with an output signal of the phase reset signal detector. Thus, a stable sync signal without a sudden change in phase can be obtained although it is synchronized with the input sync signal.

18 Claims, 17 Drawing Sheets

SYNC SIGNAL GENERATOR FOR GENERATING A SECOND SYNC SIGNAL SYNCHRONIZED WITH A FIRST SYNC SIGNAL

BACKGROUND OF THE INVENTION

The present invention relates to a sync signal generator and, more particularly, to a sync signal generator of a television receiver which is installed in a vehicle and can also provide a good video image even when a video signal is received while the vehicle is moving.

Hitherto, as a television receiver for use in a vehicle, a receiver disclosed in JP-A-61-70878 (laid open on Apr. 11, 1986) has been known as an example. The television receiver of the above conventional example comprises: four diversity antennas installed to a moving object; a switching circuit for switching so as to connect either one of outputs of the four antennas to an antenna input circuit of a television receiver installed in the moving object; and a controller for time-sharingly switching the switching circuit by a sampling switching control signal which is generated within a vertical blanking period of a television video signal, for comparing levels of the detection outputs of the antennas, for allowing the antenna having the highest level to be connected to the antenna input circuit of the television receiver, and for holding such a state until a next vertical blanking period, wherein the optimum receiving state is always held even if the reception environment is changed by the movement of the vehicle.

However, in the conventional technique, no consideration is made to a point of stabilization of synchronism and there is a problem such that a reception image is deteriorated by a large sync fluctuation which is caused by a ghost phenomenon, a fading phenomenon, and the like which occur due to influences by waves which are reflected by a building or the like during running.

It is an object of the invention to solve the problems of the conventional technique and to provide a sync signal generator which can obtain both of stable horizontal and vertical sync signals even during the running of a vehicle.

SUMMARY OF THE INVENTION

According to an aspect of the present invention, use is made of a phase reset signal detector for reducing a phase fluctuation of an input sync signal and a sync signal generator for outputting a second sync signal synchronized with an output signal of the phase reset signal detector.

A phase fluctuation is reduced by the phase reset signal detector as compared with a phase fluctuation of an inputted first sync signal and a second sync signal synchronized with the output signal of the phase reset signal detector is generated from the sync signal generator, so that the stable second sync signal without a sudden phase change is obtained although it is synpchronized with the first sync signal.

DESCRIPTION OF THE PREFERRED EMBODIMENTS

Practical embodiments of the invention will be described hereinbelow with reference to the drawings.

Figure 1:
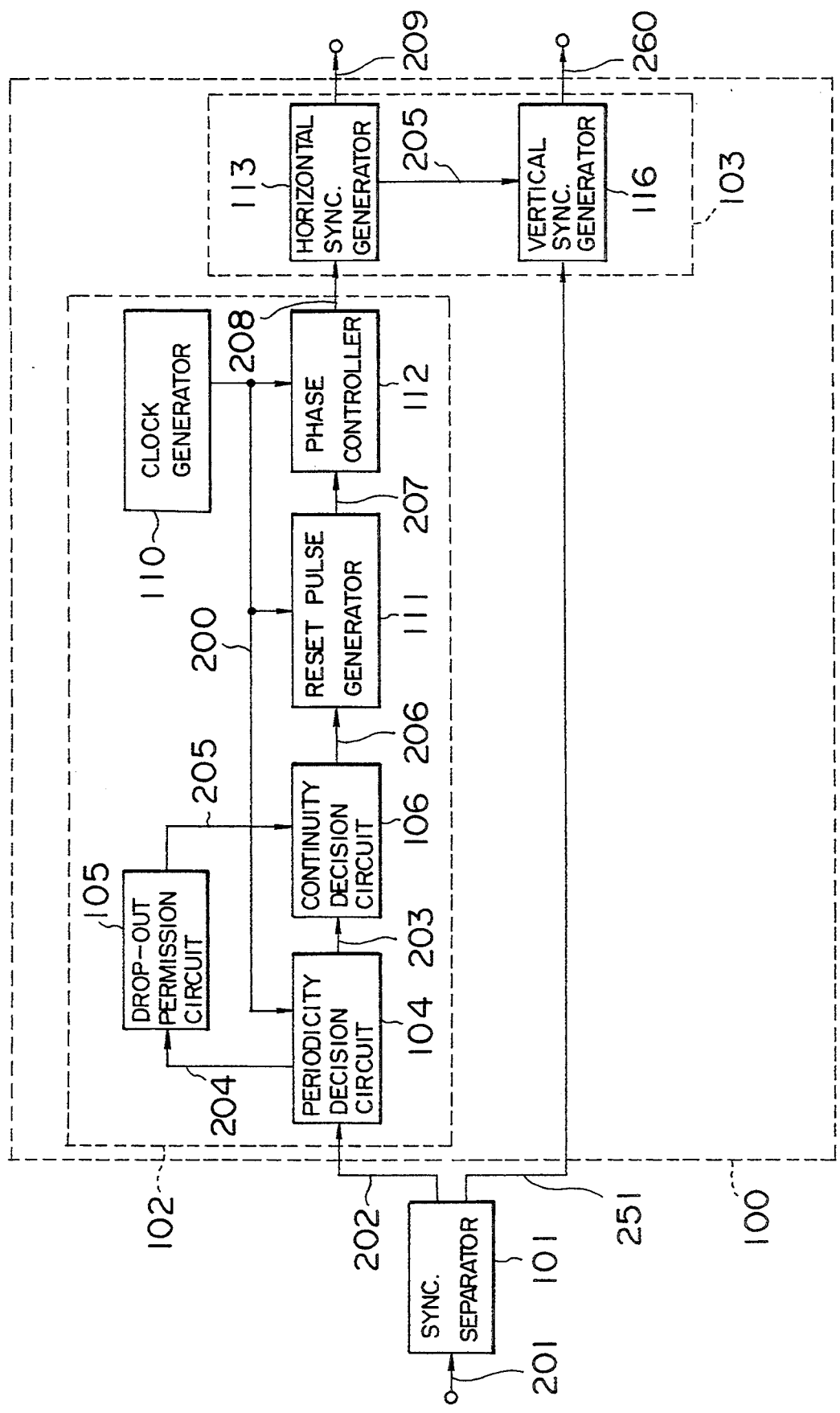
FIG. 1 is a block diagram showing an embodiment of the present invention.

FIG. 1 is a block diagram showing an embodiment of the invention.

Figure 2:
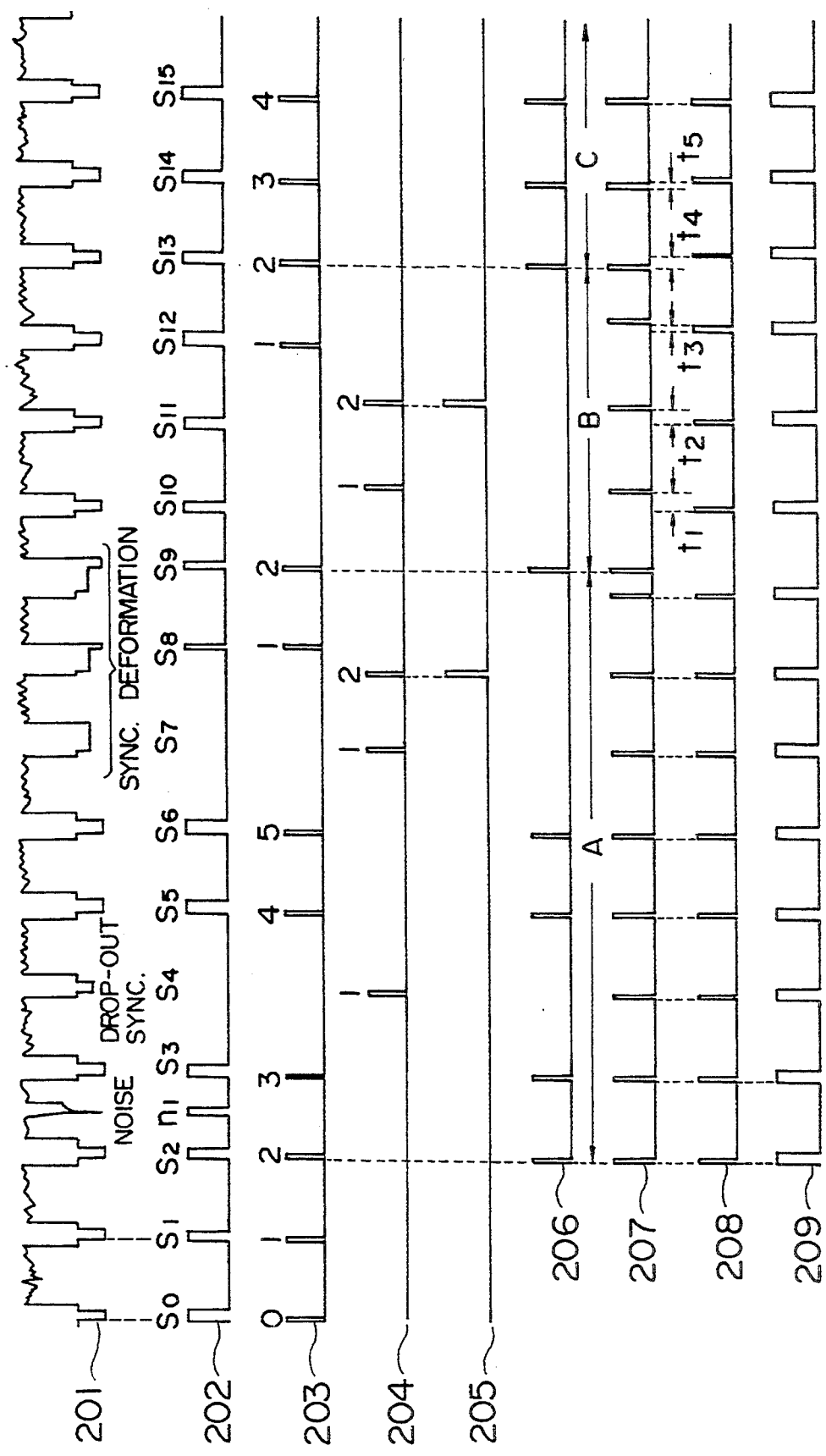
FIG. 2 is a timing chart for explaining the operation of FIG. 1.

FIG. 2 is a timing chart for explaining the operation of FIG. 1.

In FIG. 1, reference numeral 100 denotes a sync signal generator; 101 a sync separator; 102 a phase reset signal detector system; 103 a sync signal generator system; 104 a horizontal periodicity decision circuit; 105 a drop-out permission circuit; 106 a continuity decision circuit; 110 a reference clock generator; 111 a reset pulse generator; 112 a phase controller; 113 a horizontal sync signal generator; and 116 a vertical sync signal generator.

In FIG. 2, reference numeral 201 denotes an input video signal; 202 a horizontal sync separation output signal of the sync separator 101; 203 a continuity decision output signal of the horizontal periodicity decision circuit 104; 204 a drop-out decision output signal of the horizontal periodicity decision circuit 104; 205 an output signal of the drop-out permission circuit 105; 206 an output signal of the continuity decision circuit 106; 207 an output signal of the reset pulse generator 111; 208 an output signal of the phase controller 112; and 209 an output signal of the horizontal sync signal generator 113.

The sync signal generator 100 comprises the phase reset signal detector system 102 and the sync signal generator system 103.

First, the phase reset signal detector system 102 will be described. The horizontal sync signal 202 which was separated from the video signal 201 by the sync separator 101 is output to the phase reset signal detector system 102. The horizontal sync separation signal 202 is sequentially input to the horizontal periodicity decision circuit 104, by which discrimination is made to see if the signal 202 has the same periodicity as that of the standardized inherent horizontal sync signal or not. The signal having the same periodicity as that of the Standardized inherent horizontal sync signal which is used as,a reference in such a discrimination can be obtained by frequency dividing a reference clock 200 having a frequency which is integer times as high as a frequency of the horizontal sync signal which is output from the reference clock generator 110.

In FIG. 2, when the discrimination about the periodicity is started from an input timing of $S_0$ of the horizontal sync separation signal 202, if a next input pulse $S_1$ is input at a time point after the elapse of one correct period, it is determined that there is a periodicity. Thus, "1" of the pulse 203 is output. After that, in a manner similar to the above, each time it is decided that input pulses $S_2$ and $S_3$ of the horizontal sync separation signal 202 have the periodicity, the pulses 203 are output as "2" and "3". On the other hand, even if a noise $n_1$ having no periodicity has been mixed in the signal 202, the noise is not output. In the case where the periodicity decision pulses 203 of a predetermined number or more continued, the continuity decision circuit 106 outputs the signals 206 synchronized with the periodicity decision pulses 203 to the reset pulse generator 111. In FIG. 2, it is assumed that the signal pulse 206 is outputted when two or more periodicity decision pulses 203 successively appear.

Now, assuming that a pulse $S_4$ of the horizontal sync separation signal 202 dropped out as shown in FIG. 2, the horizontal periodicity decision circuit 104 outputs the drop-out decision pulse 204 to the drop-out permission circuit 105. If predetermined number of ore more signal drop-out decision pulses 204 successively appear, the drop-out, permission circuit 105 supplies the signal pulse 205 to the continuity decision circuit 106 so that the count value for the periodicity decision pulses 203 at the continuity decision circuit 106 is reset; In FIG. 2, since the set value for permission of the signal drop-out has been set to 2, the count value for the periodicity decision pulses 203 at the continuity decision circuit 106 is reset for the pulse $S_4$ of the signal 202. However, if two pulses successively drop-out, as shown by $S_7$ and $S_8$ the drop-out permission circuit 105 outputs the signal 205, so that the count value for the periodicity decision pulses 203 at the continuity decision circuit 106 is reset.

The reset pulse generator 111 divides the reference clock 200, thereby generating a reset pulse 207 which has the same period as that of the-horizontal sync signal and whose phase is matched with that of the output signal 206 of the continuity decision circuit 106. The phase controller 112 decreases a phase difference between the phase of the reset pulse 207 which is input from the reset pulse generator 111 and the phase of an output signal 208 of the phase controller 112 by only an arbitrary set value every period of the output signal 208 of the phase controller 112. In FIG. 2, it is now assumed that a period of time when the phase of the reset pulse 207 is equal to $T_r$ is set to A, a period of time when the phase is equal to $T_m$ is set to B, and a period of time, when the phase is again equal to $T_r$ is set to C. The phase of the signal 208 coincides with the phase $T_r$ of the reset pulse 207 for the period of time A. However, for the period of time B when the phase of the reset pulse 207 changes from $T_r$ to $T_m$, the phase difference between the reset pulse 207 and the signal 208 is gradually reduced every period of the signal 208. That is, assuming that a set value for reduction of the phase difference is set to $t_x$, the phase difference between the assuming that a set value for reduction of the phase signal 208 and the reset pulse 207 is set to $t_3 = t_2 - t_x = t_1 - 2t_x$. In a manner similar to the above, for the period of time C when the phase of the reset pulse 207 again changes to $T_r$, the phase of the signal 208 is controlled so as to gradually approach the reset pulse 207. As mentioned above, even if the phase of the reset pulse 207 suddenly changed, the phase of the signal 208 does not suddenly change but gradually follows such a sudden change in phase.

The sync signal generator system 103 will now be described.

The horizontal sync generator 113 generates a horizontal sync signal 209 which has the same duty ratio as that of the standardized inherent horizontal sync signal and whose phase is matched with that of the output signal 208 of the phase controller 112. The horizontal sync generator 113 also generates a clock signal 250 having a frequency which is even-number times as high as the frequency of the horizontal sync signal. One the other hand, the vertical sync generator 116 frequency divides the clock signal having a frequency which is even-number times as high as the frequency of the horizontal sync signal which is obtained from the horizontal sync generator 113, that is, the clock signal 250 having a frequency which is integer times as high as the frequency of the vertical sync signal, thereby generating a vertical sync signal 260 which has the same duty ratio as that of the standardized inherent vertical sync signal and whose phase is matched with that of an output sync separation signal 251 of the sync separator 101.

Figure 3:
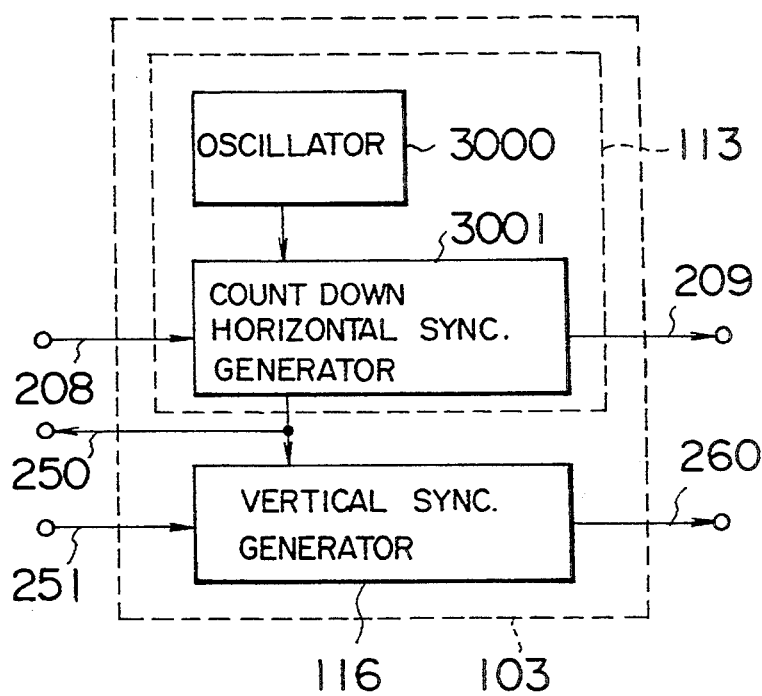
FIG. 3 is a block diagram showing a practical example of a sync signal generator in FIG. 1.
Figure 4:
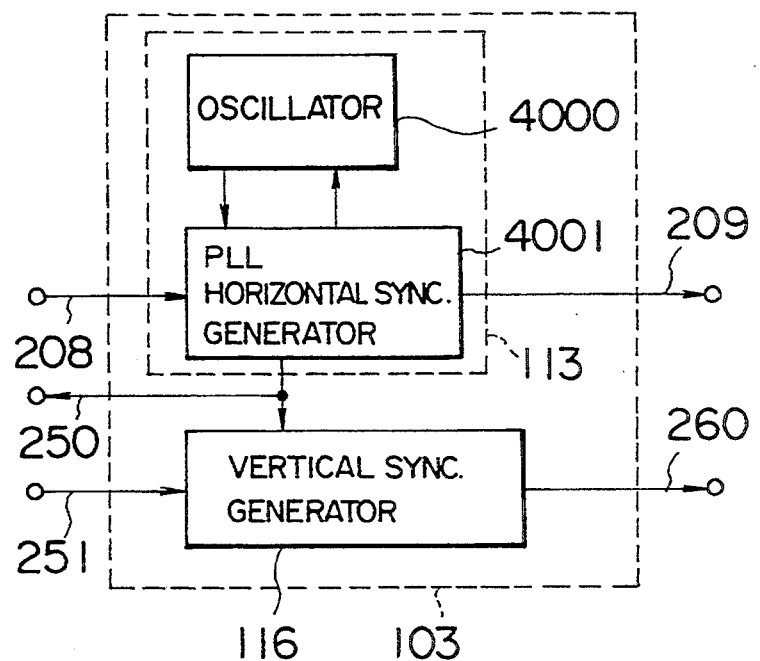
FIG. 4 is a block diagram showing a practical example of a sync signal generator in FIG. 3.

The sync signal generator system 103 can be realized by a count-down sync generator shown in FIG. 3 or a PLL sync generator shown in FIG. 4 or the like.

According to the embodiment, even if a noise component having no periodicity has been multiplexed into the sync separation signal 202, it is eliminated by the periodicity decision circuit 104. Thus, the output sync signal 209 can be stabilized.

On the other hand, even in the case where the sync signal of the input video signal 201 deforms or drops out, if the deformation or drop-out of the sync signal does not continuously occur by the set number or more of the drop-out permission circuit 105, the phase of the output sync signal 209 does not change. Therefore, the stable output sync signal 209 can be derived.

Further, even in the case where the deformation or drop-out of the sync signal of the input video signal 201 continuously occurs by the set number or more of the drop-out permission circuit, the phase of the output horizontal sync signal 209 does not suddenly change but slowly changes by the horizontal phase controller 112, so that the stable output horizontal sync signal 209 can be obtained.

Further, as mentioned above, by stabilizing the operation of the horizontal sync generator 113, the signal 250 which is input from the horizontal sync generator 113 to the vertical sync generator 116 can be also stabilized. Therefore, the operation of the vertical sync generator 116 also becomes stable and the stability of the output vertical sync signal 260 can be increased.

Figure 5:
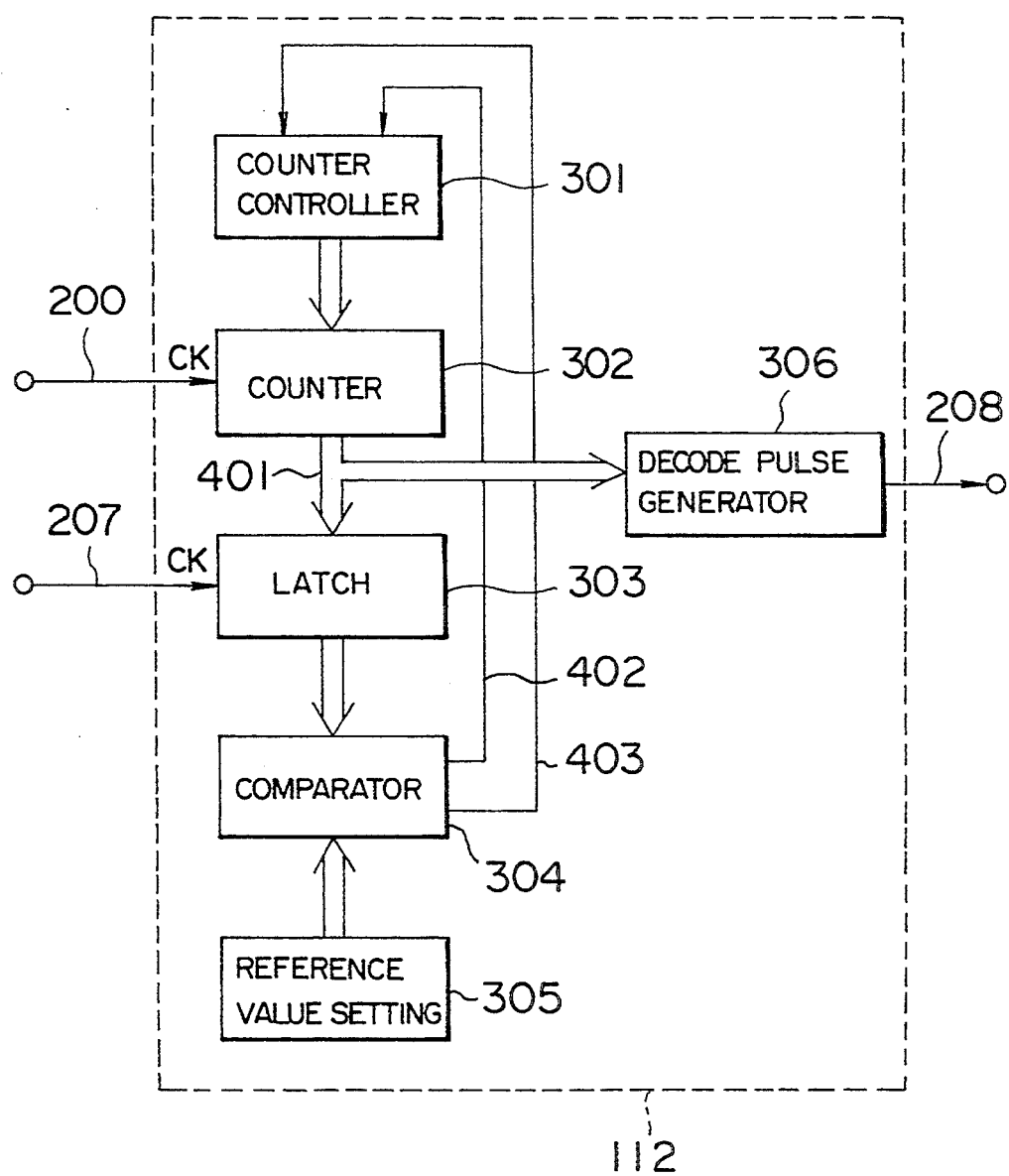
FIG. 5 is a block diagram showing a practical example of a phase controller in FIG. 1.
Figure 6:
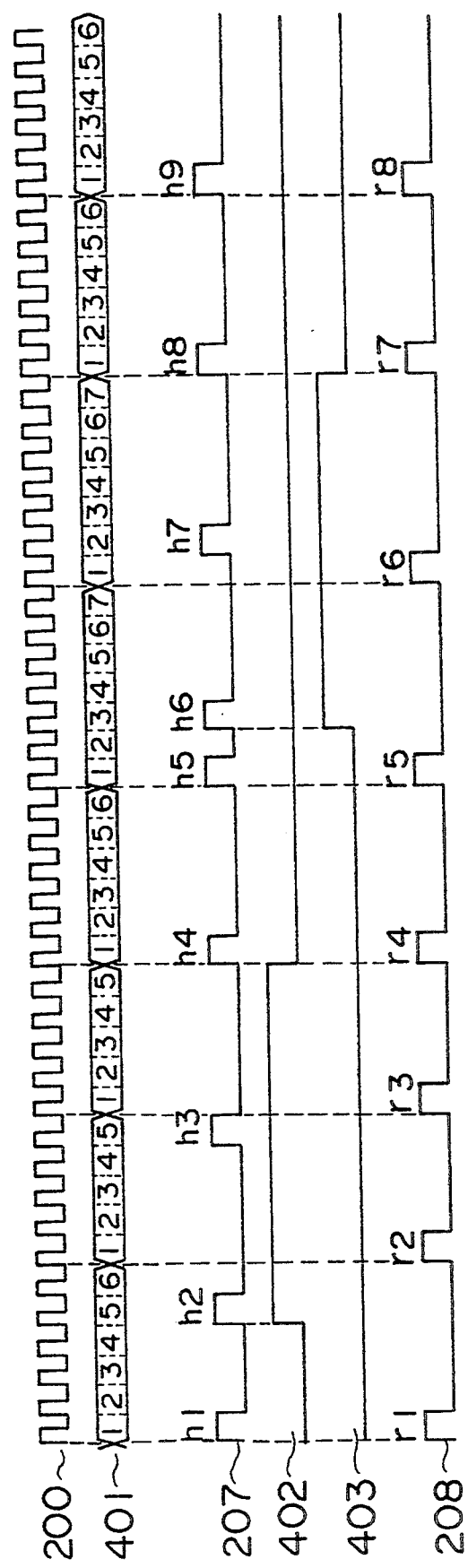
FIG. 6 is a timing chart for explaining the operation of FIG. 5 example of a phase controller.

FIG. 5 shows a practical example of the phase controller 112. FIG. 6 is a time chart for explaining FIG. 5.

In FIG. 5, reference numeral 301 denotes a counter controller; 302 a counter; 303 a latch; 304 a comparator; 305 a reference value setting circuit; and 306 a decode pulse generator.

In FIG. 6, reference numeral 401 denotes output data of the counter 302. Reference numerals 402 and 403 indicate output signals of the comparator 304.

The reference clock 200 which is input from the reference clock generator 110 in FIG. 1 is frequency divided by the counter 302, thereby obtaining the data train 401. In FIG. 6, each of numerical values shown in the data train 401 denotes a count number of the reference clocks 200. In FIG. 6, six divided pulses of the reference clocks 200 correspond to one period of the standardized inherent horizontal sync signal.

The latch 303 fetches data from the data train 401 when the output signal 207 of the reset pulse generator 111 in FIG. 1 is set to the high level. The comparator 304 compares the data fetched into the latch 303 with a reference value which is input from the reference value setting circuit 305 and outputs the signals 402 and 403. In FIG. 6, the signal 402 is set to the high level when the data fetched into the latch 303 is equal to "5", "6", and "7". The signal 403 is set to the high level when the data is equal to "2","3", and "4".

The counter controller 301 allows the counter 302 so as to frequency divide the reference clocks 200 into 1/5 when the signal 402 is set to the high level. The counter controller 301 allows the counter 302 to frequency divide the reference clocks 200 into 1/7 when the signal 403 is set to the high level. When both of the signals 402 and 403 are set to the low level, the counter controller 301 allows the counter 302 to frequency divide the reference clocks 200 into 1/6.

The output pulse generator 306 outputs the horizontal phase control signal 208 whose phase is matched with "1" from the data train 401.

In FIG. 6, the phase of a pulse $r_2$ of the phase control signal 208 is delayed by two clocks than the phase of a pulse $h_2$ whose phase changes in the reset pulses 207. However, the dividing number of the counter 302 to obtain the signal 208 having the same period as that of the standardized inherent horizontal sync signal by frequency dividing the reference clocks 200 into 1/6 is reduced to 5 for a period of time when the signal 402 is set to the high level, thereby reducing the phase delay of a pulse $r_3$ for a next pulse $h_3$ to one clock. In a manner similar to the above, the phase of a pulse $r_4$ is made coincident with the phase of a next pulse $h_4$.

On the contrary, even in the case where the phase of the phase control signal 208 is progressed than the phase of the horizontal reset pulse signal 207 as in the relation between a pulse $h_7$ and a pulse $r_6$, by increasing the dividing number of the counter 302 to 7 for a period of time when the signal 403 is set to the high level, the phase of a next pulse $h_8$ is made coincident with the phase of a pulse $r_7$.

Figure 7:
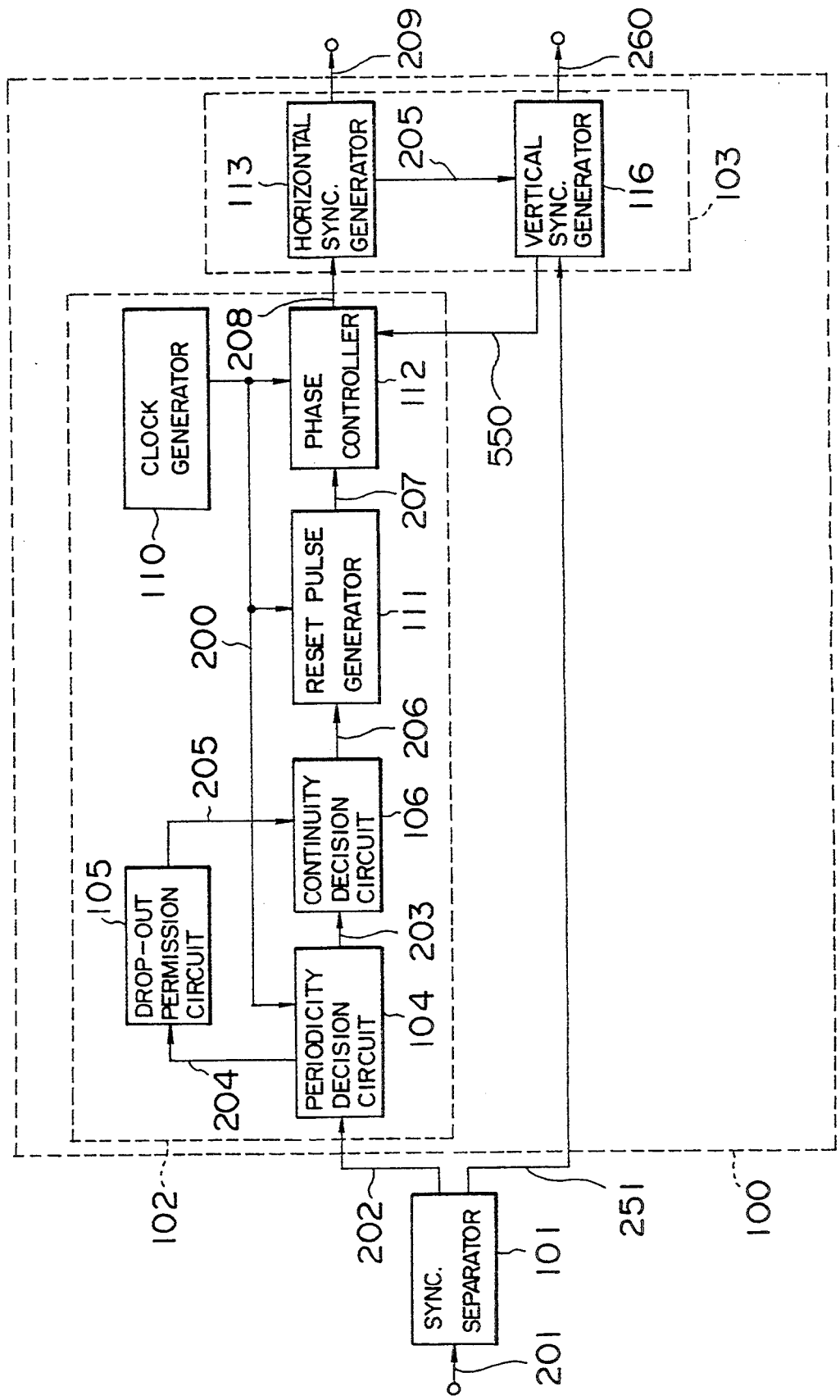
FIG. 7 is a block diagram showing another embodiment of the invention.

FIG. 7 shows another embodiment of the invention.

In FIG. 7, reference numeral 550 denotes a timing signal.

In FIG. 7, the parts and components having the same functions as those shown in FIG. 1 are designated by the same reference numerals.

FIG. 7 differs from Fig. 1 with respect to the following point. That is, the phase controller 112 is controlled by the timing signal 550 which is output from the vertical sync generator 116, the phase of the phase control signal 208 is controlled so as to follow the reset pulse 207 for a control period of time which has arbitrarily been set in a vertical blanking period, and the phase of the phase control signal 208 is fixed in the other periods.

According to the invention, by limiting a period of time when the phase of the phase control signal 208 changes to an arbitrary period within the vertical blanking period of time, occurrence of changes of the phase of the output horizontal sync signal 209 is also limited to an arbitrary period of time within the vertical blanking period of time. Therefore, there is an advantage such that a fluctuation of an image due to a change in phase of the output horizontal sync signal 209 doesn't appear on the display.

Further, according to the embodiment, even in the case where the sync signal of the input video signal 201 deforms or drops out, a change amount of the phase per vertical period of time of the output horizontal sync signal 209 is smaller than that in the example of FIG. 1, so that the stable output horizontal sync signal 209 can be obtained.

Further, by stabilizing the operation of the horizontal sync generator 113 as mentioned above, the signal 250 which is input from the horizontal sync generator 113 to the vertical sync generator 116 can be also stabilized. Therefore, the operation of the vertical sync generator 116 also becomes stable and the stability of the output vertical sync signal 260 can be increased.

Figure 8:
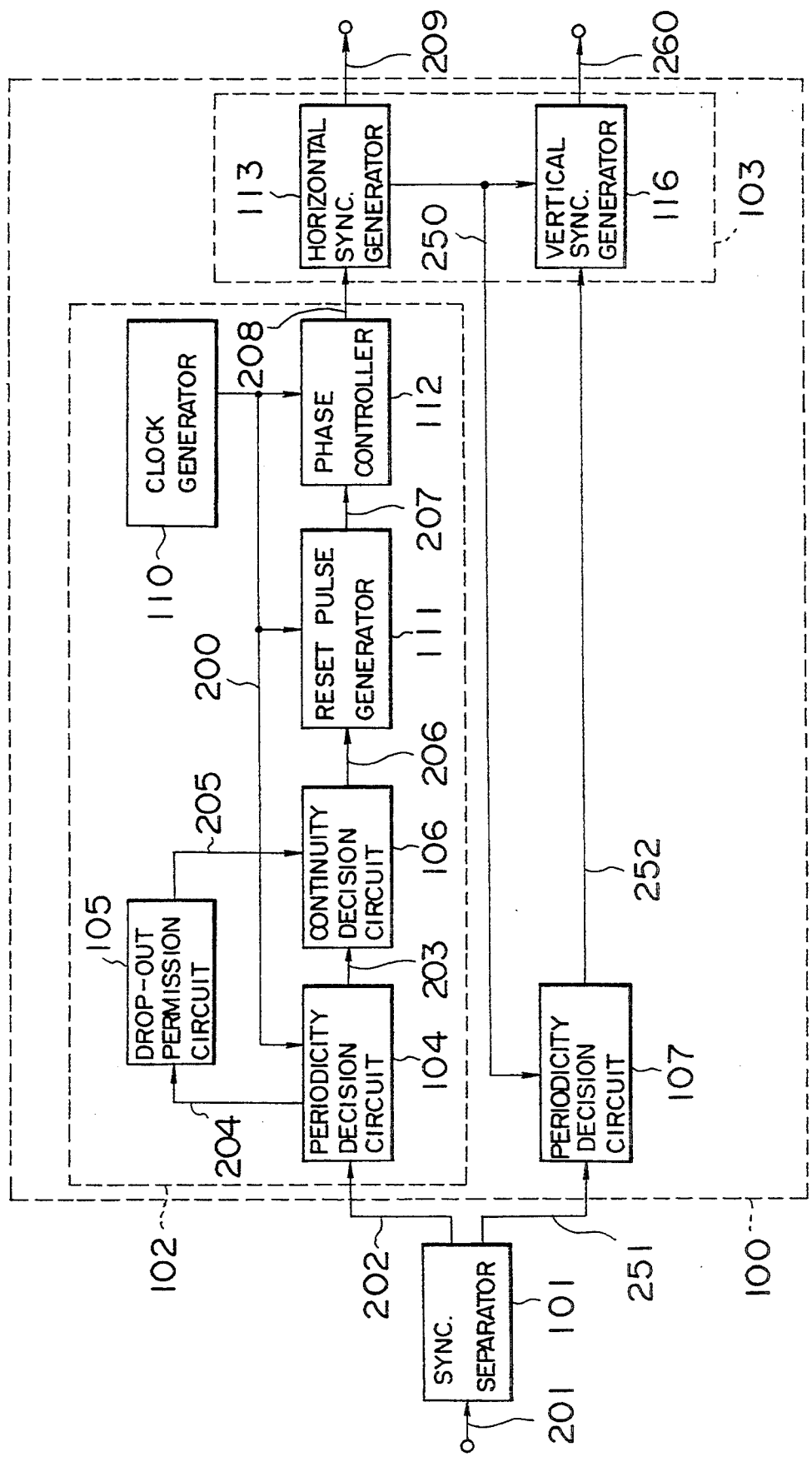
FIG. 8 is a block diagram showing still another embodiment of the invention.

FIG. 8 shows still another embodiment of the invention.

In FIG. 8, reference numeral 107 denotes a vertical periodicity decision circuit.

In FIG. 8, the parts and components having the same functions as those shown in FIG. 1 are designated by the same reference numerals.

FIG. 8 differs from FIG. 1 with respect to the following point. That is, the periodicity decision circuit 107 is also provided for the vertical system, thereby further raising the stability of the output vertical sync signal 260.

According to the embodiment, the stable horizontal and vertical sync signals can be obtained in a manner similar to the example of FIG. 1.

Figure 9:
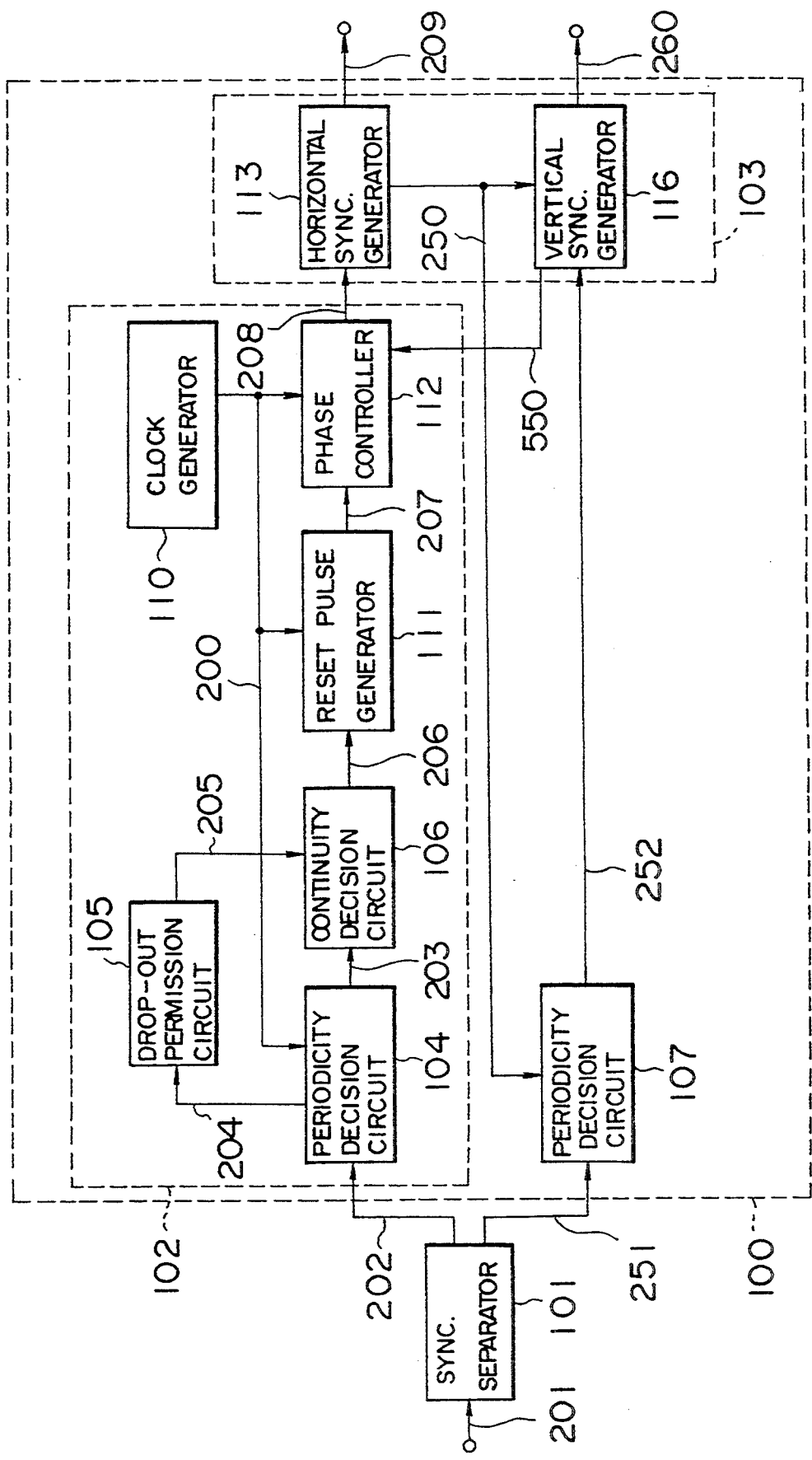
FIG. 9 is a block diagram showing further another embodiment of the invention.

FIG. 9 shows further another embodiment of the invention.

In FIG. 9, the parts and components having the same functions as those shown in FIGS. 7 and 8 are designated by the same reference numerals.

FIG. 9 differs from FIG. 8 with respect to the following point. That is, the phase controller 112 is controlled by the timing signal 550 which is output from the vertical sync generator 116, the phase of the phase control signal 208 is controlled so as to follow the reset pulse signal 207 for a control period of time which has arbitrarily been set within the vertical blanking period of time, and the phase of the phase control signal is fixed for the other periods.

According to the embodiment, the stable horizontal and vertical sync signals can be obtained in a manner similar to the example of FIG. 7.

Figure 10:
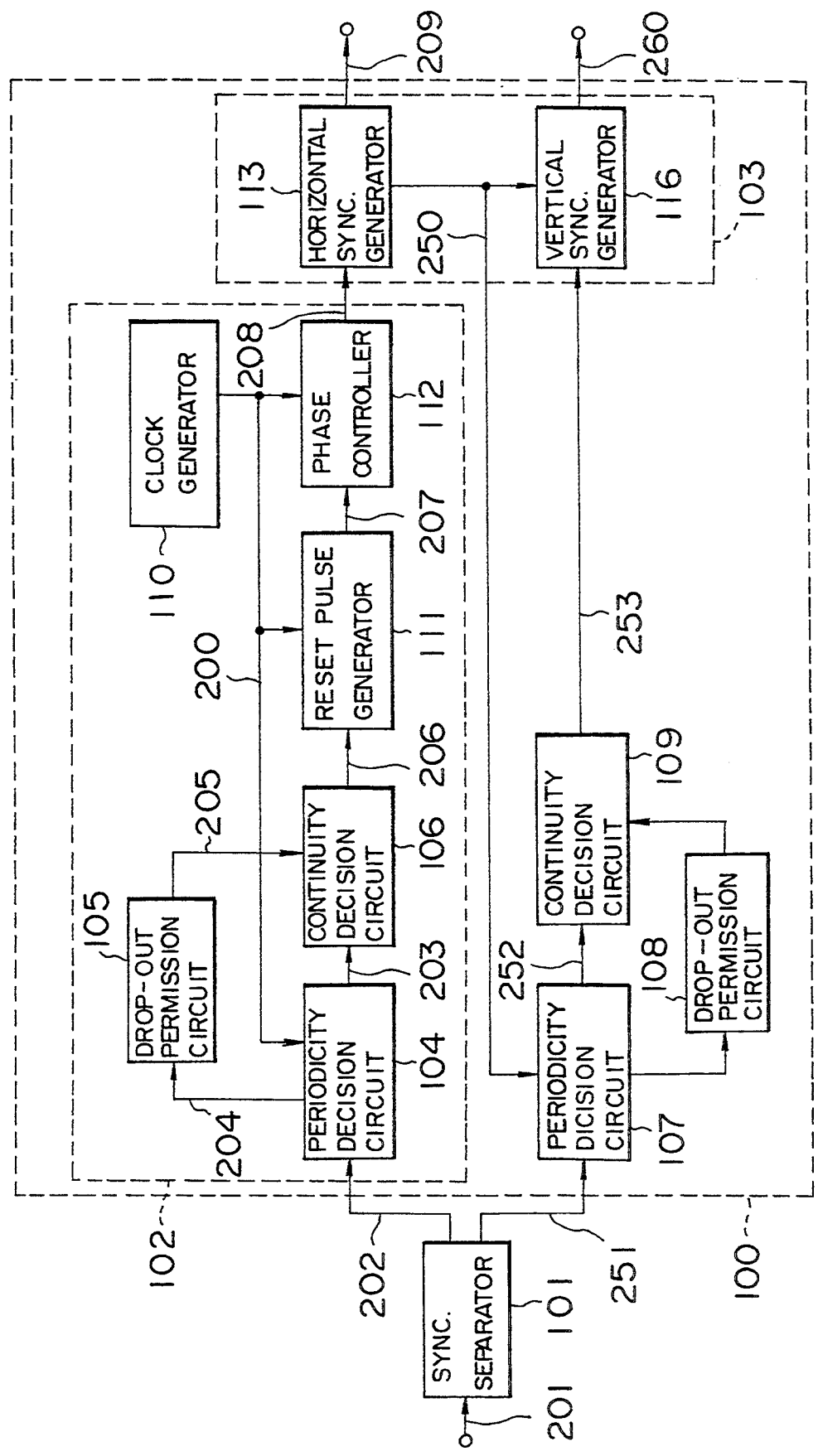
FIG. 10 is a block diagram showing further another embodiment of the invention.

FIG. 10 shows further another embodiment of the invention.

In FIG. 10, reference numeral 108 denotes a second drop-out permission circuit and 109 indicates a second continuity decision circuit.

In FIG. 10, the parts and components having the same functions as those shown in FIG. 8 are designated by the same reference numerals.

FIG. 10 differs from FIG. 8 with respect to the following point. That is, the drop-out permission circuit 108 and the continuity decision circuit 109 are also provided for the vertical system, thereby further raising the stability of the output vertical sync signal 260.

According to the embodiment, the stable horizontal and vertical sync signals can be obtained in a manner similar to the example of FIG. 1.

Figure 11:
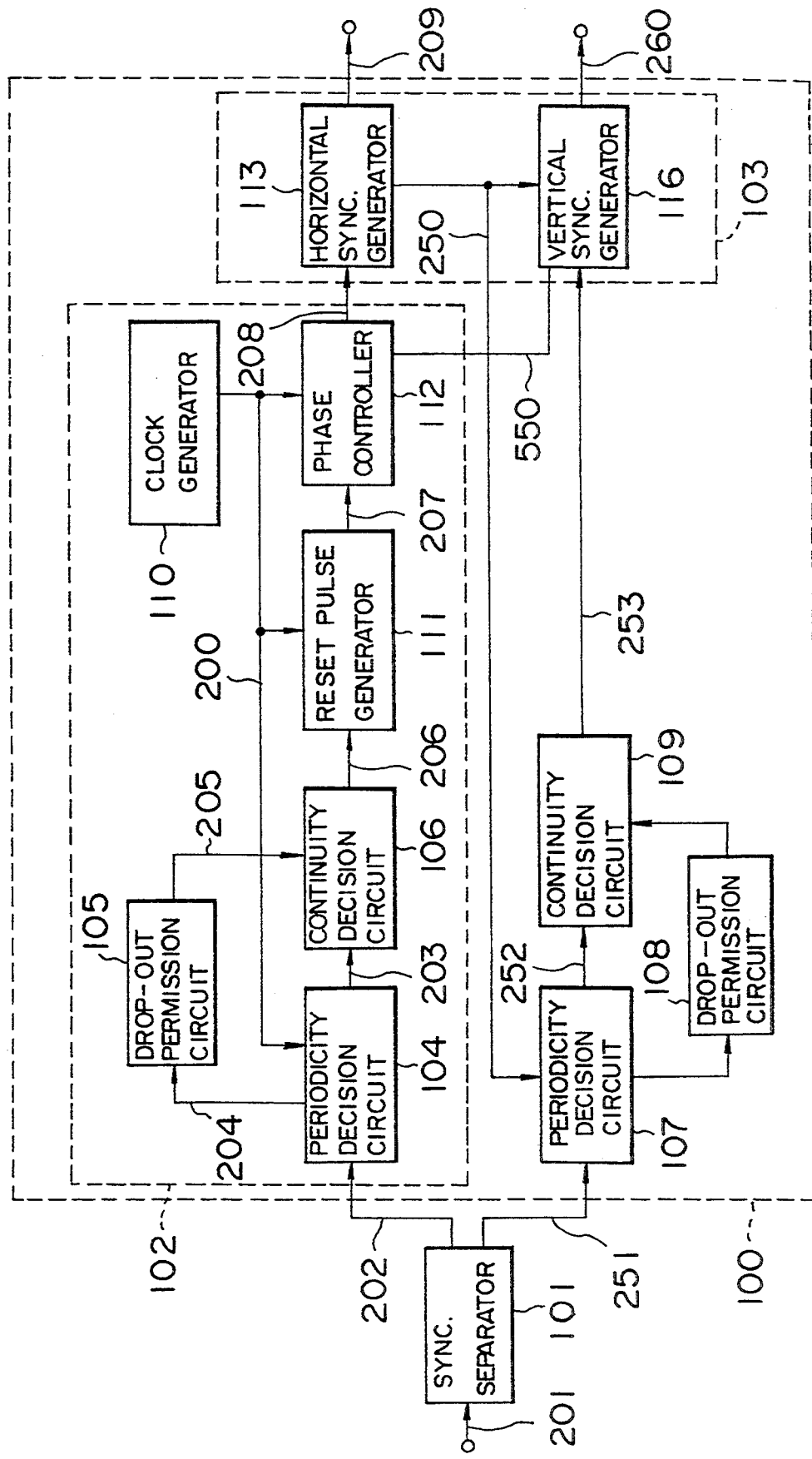
FIG. 11 is a block diagram showing further another embodiment of the invention.

FIG. 11 shows further another embodiment of the invention.

In FIG. 11, the parts and components as those shown in FIGS. 7 and 10 are designated by the same reference numerals.

FIG. 11 differs from FIG. 10 with respect to the following point. That is, the phase controller 112 is controlled by the timing signal 550 which is output from the vertical sync generator 116, the phase of the phase control signal 208 is controlled so as to follow the reset pulse 207 for a control period of time which has arbitrarily been set within the vertical blanking period of time, and the phase of the phase control signal 208 is fixed for the other periods.

According to the embodiment, the stable horizontal and vertical sync signals can be obtained in a manner similar to the example of FIG. 7.

Figure 12:
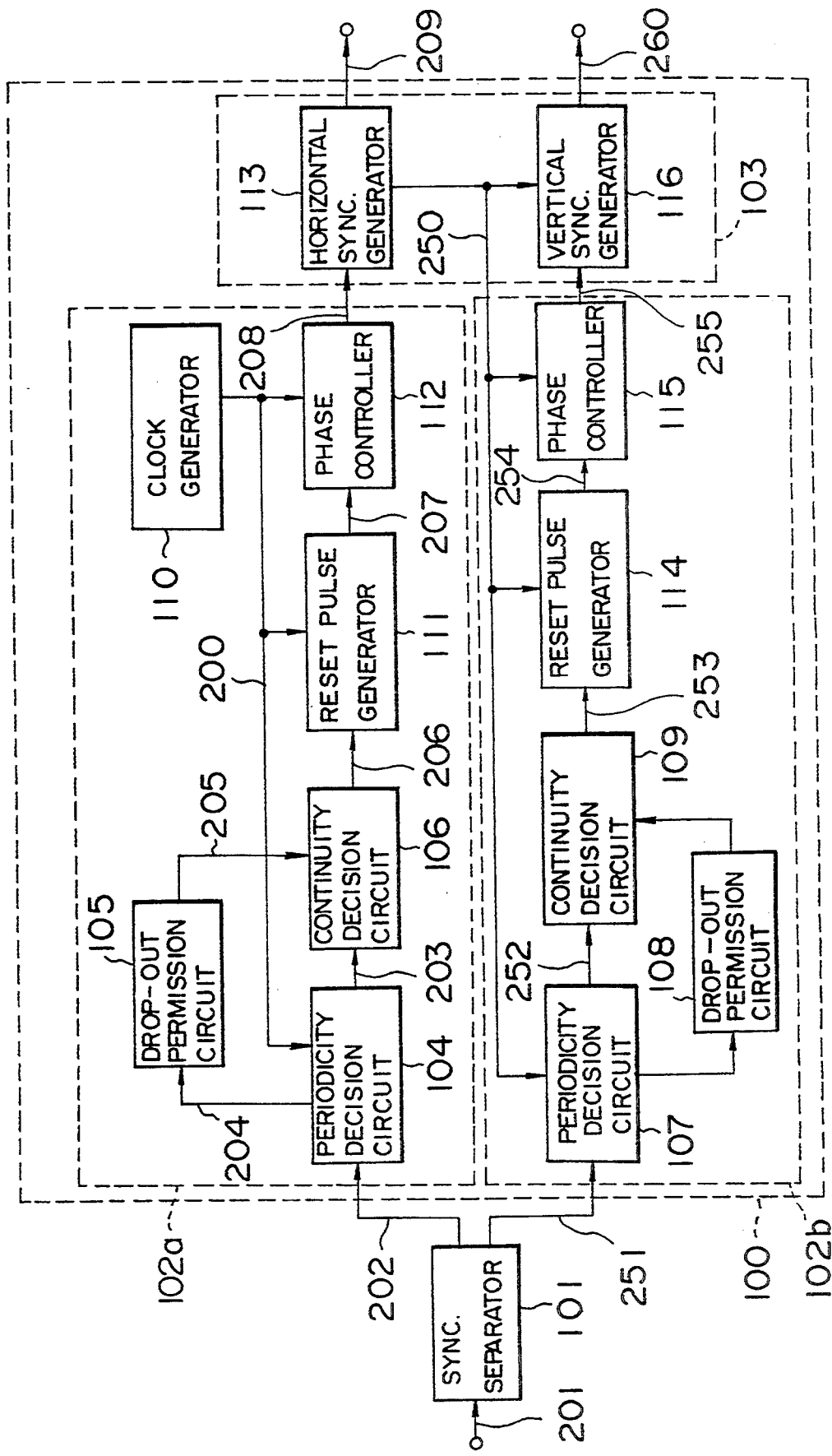
FIG. 12 is a block diagram showing further another embodiments of the invention.

FIG. 12 shows further another embodiment of the invention.

In FIG. 12, reference numerals 102a and 102b denote phase reset signal detectors, 114 indicates a second reset pulse generator, and 115 a second phase controller.

In FIG. 12, the parts and components having the same functions as those shown in FIG. 1 are designated by the same reference numerals.

FIG. 12 differs from FIG. 1 with respect to the following point. That is, the phase reset signal detector is also provided for the vertical system, thereby further raising the stability of the output vertical sync signal 260.

According to the embodiment, the stable horizontal and vertical sync signals can be obtained in a manner similar to the example of FIG. 1.

Figure 13:
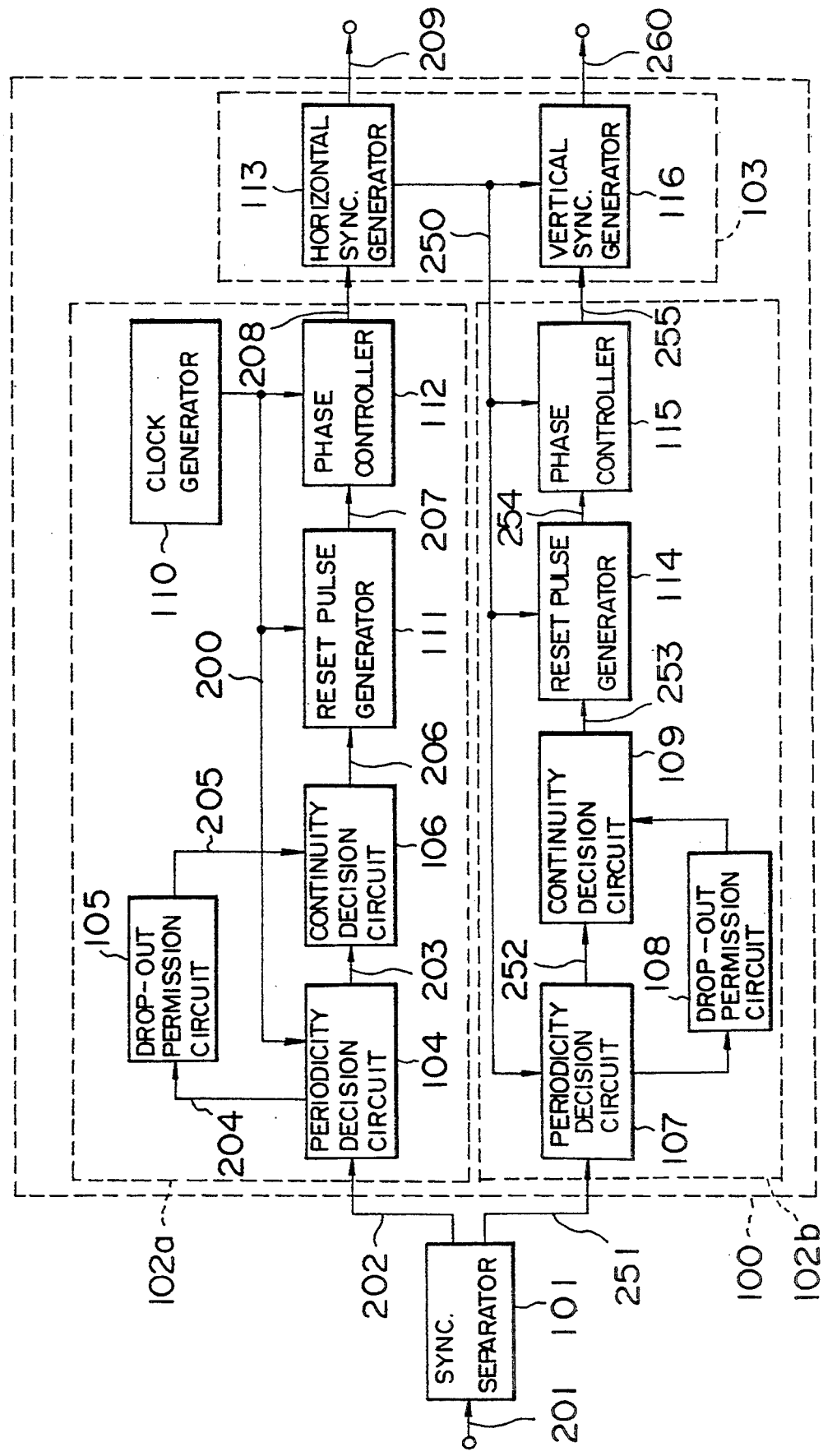
FIG. 13 is a block diagram showing further another embodiment of the invention.

FIG. 13 shows further another embodiment of the invention.

FIG. 13, the parts and components having the same functions as those shown in FIGS. 7 and 12 are designated by the same reference numerals.

FIG. 13 differs from FIG. 12 with respect to the following point. That is, the phase controller 112 is controlled by the timing signal 550 which is output from the vertical sync generator 116, the phase of the phase control signal 208 is controlled so as to follow the reset pulse 207 for a control period of time which has arbitrarily been set within the vertical blanking period of time, and the phase of the phase control signal 208 is fixed for the other periods.

According to the embodiment, the stable horizontal and vertical sync signals can be obtained in a manner similar to the example of FIG. 7.

Figure 14:
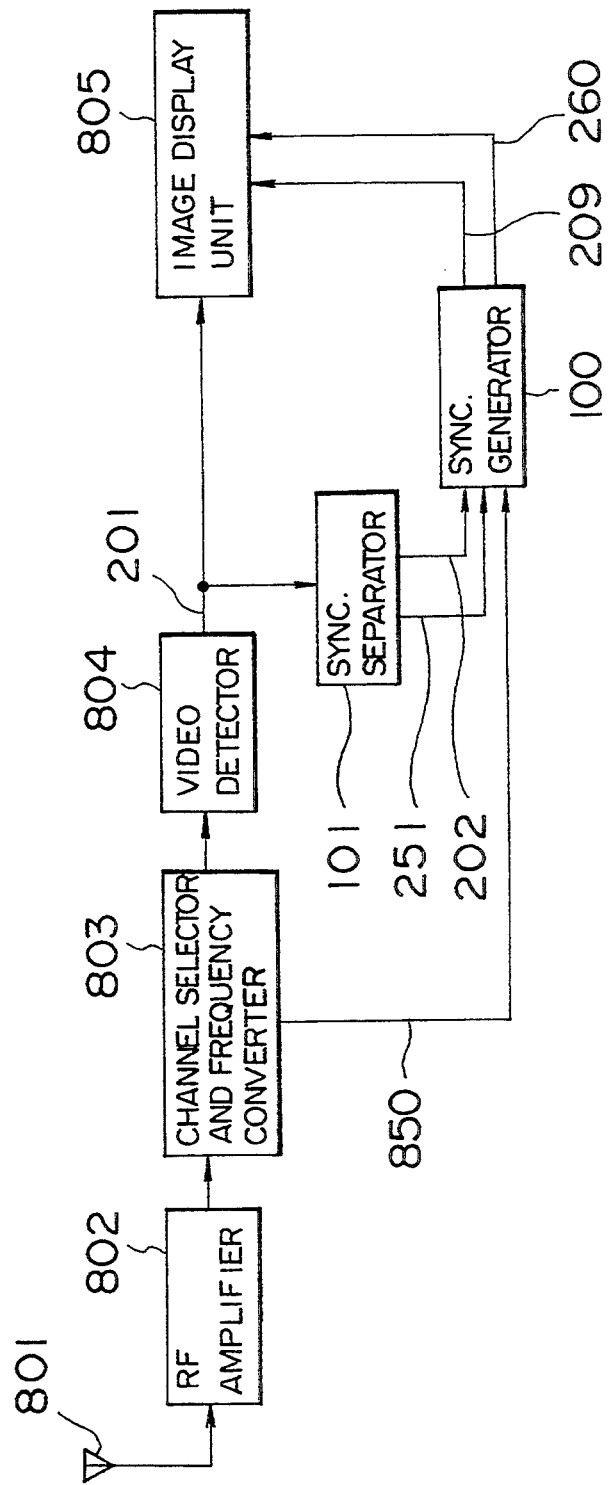
FIG. 14 is a block diagram showing a use example of the invention.

FIG. 14 shows a use example of the invention.

In FIG. 14, reference numeral 801 denotes an antenna; 802 an RF amplifier; 803 a channel selector and frequency converter; 804 a video detector; 100 the sync signal generator; 805 an image display unit; and 850 a control signal.

A TV signal which was input from the antenna 801 is transmitted through the RF amplifier 802, channel selection and frequency converter 803, and video detector 804, thereby obtaining the video signal. The stable horizontal and vertical sync signals synchronized with the sync signals included in the demodulated video signal are supplied to the display 805, thereby obtaining a TV image having a stable synchronism.

On the other hand, when TV receiving channel are switched and a power source is turned on, the control signal 850 is output from the channel selection and frequency converter 803 to the sync signal generator 100, thereby controlling the sync signal generator 100 and executing the rapid pull-in of the synchronizing phase.

In the above case, the continuity decision circuits 106 and 109 and the drop-out permission circuits 105 and 108 shown in FIGS. 1, 7, 8, 9, 10, 11, 12, and 13 switch the set values of the number of deciding times to smaller values, respectively, on the basis of the input of the control signal 850 when the TV receiving channels are switched and the power source is turned on, thereby performing the rapid pull-in of the synchronizing phase.

In a manner similar to the above, when the TV receiving channels are switched and the power source is turned on, the phase controllers 112 and 115 also switch the set values to reduce the phase difference between the input signal and the output signal to large values, thereby executing the rapid pull-in of the synchronizing phase.

By constructing as mentioned above, when the receiving channels are switched and the power source is turned on, the synchronizing phase is rapidly pulled in and, for the other periods, it is prevented that the signal follows the phase fluctuation as possible, so that the stable sync signals can be generated.

Figure 15:
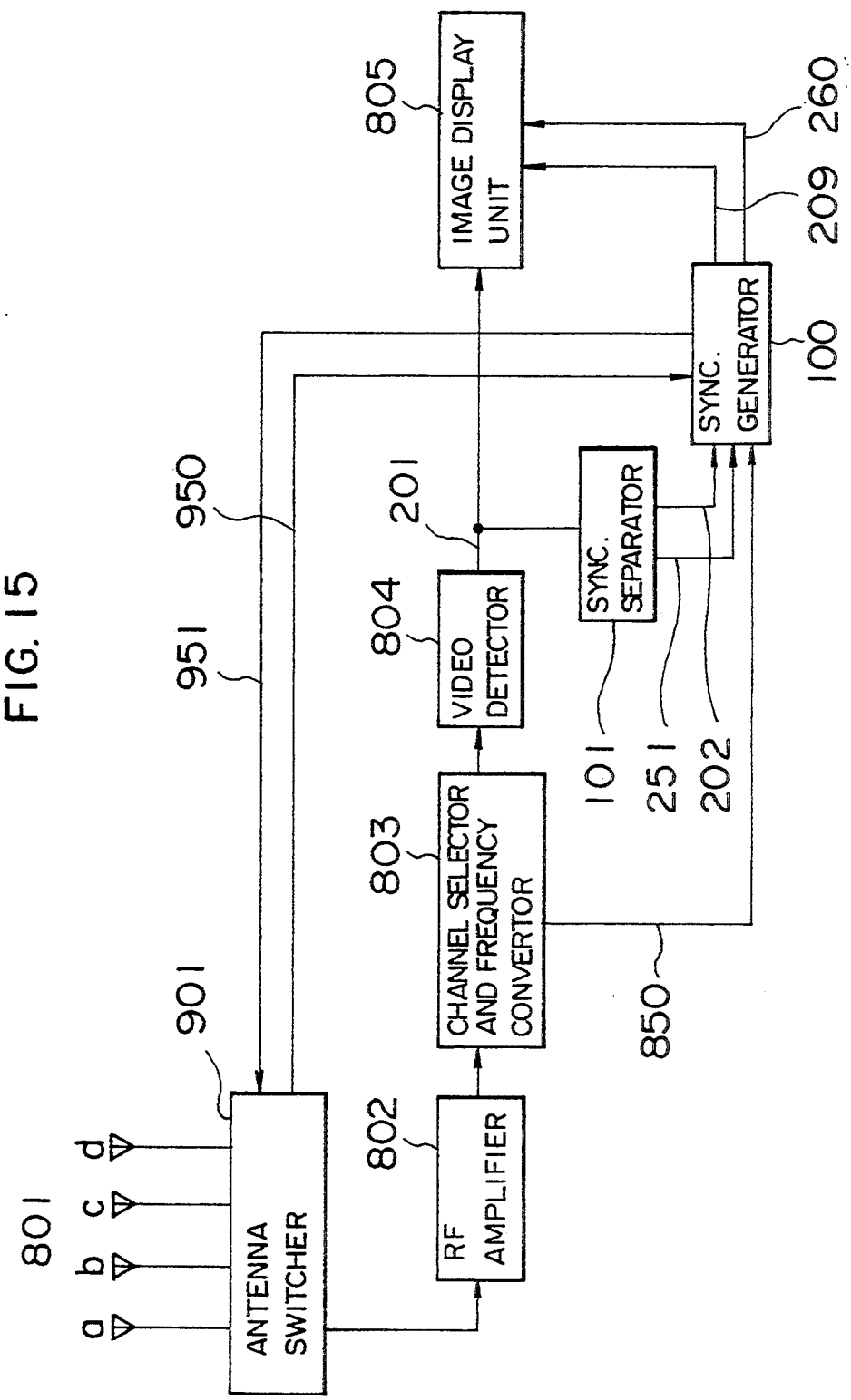
FIG. 15 is a block diagram showing another use example of the invention.

FIG. 15 shows another use example of the invention.

In FIG. 15, *a; b; c;* and *d;* of reference numeral 801 denote antennas, 901 indicates an antenna switcher, 950 an antenna switching signal, and 951 an antenna switching timing signal.

In FIG. 15, the parts and components having the same functions as those in FIG. 14 are designated by the same reference numerals.

The example of FIG. 15 differs from the example of FIG. 14 with respect to the following point. That is, the antenna switcher 901 for antenna diversity is provided and not only when the TV receiving channels are switched and the power source is turned on but also when the antennas are switched, the sync signal generator 100 is controlled by the antenna switching signal 950 and the pull-in of the synchronizing phase is rapidly executed.

In the use example, in a manner similar to the example of FIG. 15, just after the receiving channels are switched and when the antennas are switched, the synchronizing phase is rapidly pulled in and, for the other periods, it is prevented that the signal follows the phase fluctuation as possible, so that the stable sync signals can be generated.

Figure 16:
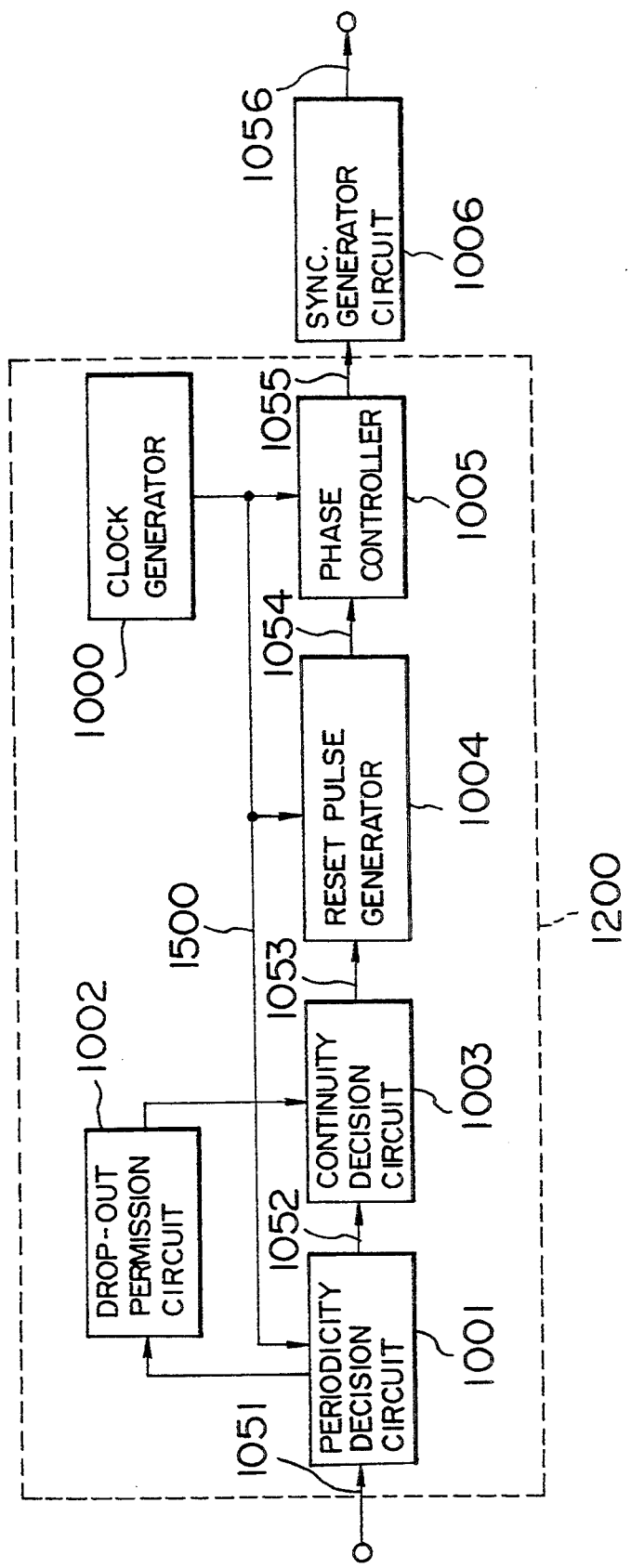
FIG. 16 is a block diagram showing further another embodiment of the invention.

FIG. 16 shows further another embodiment of the invention.

In FIG. 16, reference numeral 1000 denotes a reference clock generator; 1001 indicates a periodicity decision circuit; 1002 a drop-out decision circuit; 1003 a continuity decision circuit; 1004 a reset pulse generator; 1005 a phase controller; 1006 a sync generator circuit; and 1200 a phase reset signal detector system.

Reference numeral 1051 denotes an input sync signal; 1052 an output signal of the periodicity decision circuit 1001; 1053 an output signal of the continuity decision circuit 1003; 1054 an output signal of the reset pulse generator 1004; 1055 an output signal of the phase controller 1005; and 1056 an output sync signal of the sync generation circuit 1006.

The embodiment of FIG. 16 differs from the example of FIG. 1 with respect to the following point. The example of FIG. 1 copes with two kinds of horizontal and vertical sync signals included in the video signal. However, the embodiment of FIG. 16 copes with only a single sync signal. A construction of the embodiment is the same as the construction of only the horizontal system in FIG. 1.

According to the embodiment, even in the case where the input sync signal drops out or the phase of the input sync signal suddenly changes, the stable output sync signals can be obtained in a manner similar to the example of FIG. 1.

Figure 17:
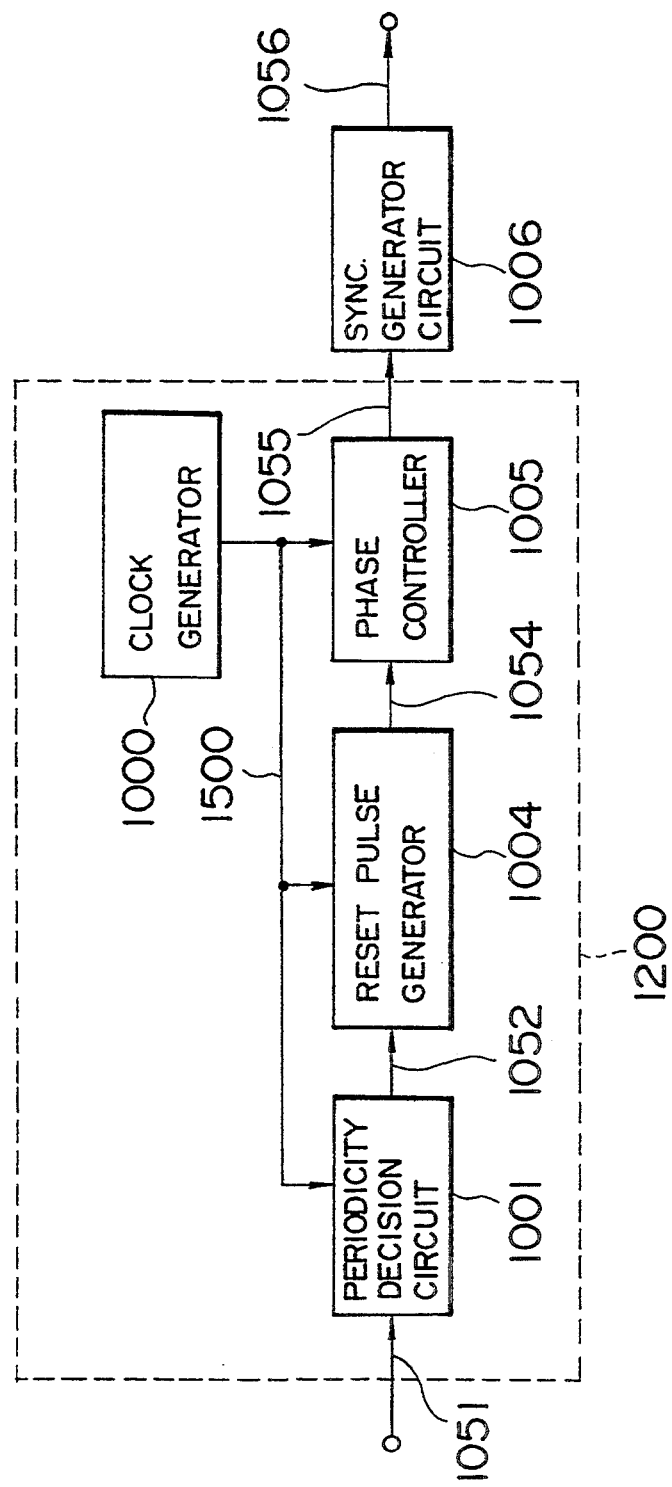
FIG. 17 is a block diagram showing further another embodiment of the invention.

FIG. 17 shows further another embodiment of the invention.

In FIG. 17, the parts and components having the same functions as those shown in FIG. 16 are designated by the same reference numerals.

The embodiment of FIG. 17 differs from the example of FIG. 16 with respect, to a point that the drop-out permission circuit 1002 and the continuity decision circuit 1003 are omitted.

According to the embodiment, even if a noise component having no periodicity has been multiplexed to the input sync Signal 1051, it is eliminated by the periodicity decision circuit 1001, so that the output sync signal 1056 can be stabilized.

On the other hand, even in the case where the input sync signal 1051 drops out, the output signal 1055 of the reset pulse generator 1004 does not drop out, so that the stable output sync signal 1056 can be obtained.

Further, even in the case where the phase of the input sync signal 1051 suddenly changes, the phase of the output sync signal 1056 doesn't suddenly change but slowly changes by the phase controller 1005, so that the stable output sync signal 1056 can be obtained.

Figure 18:
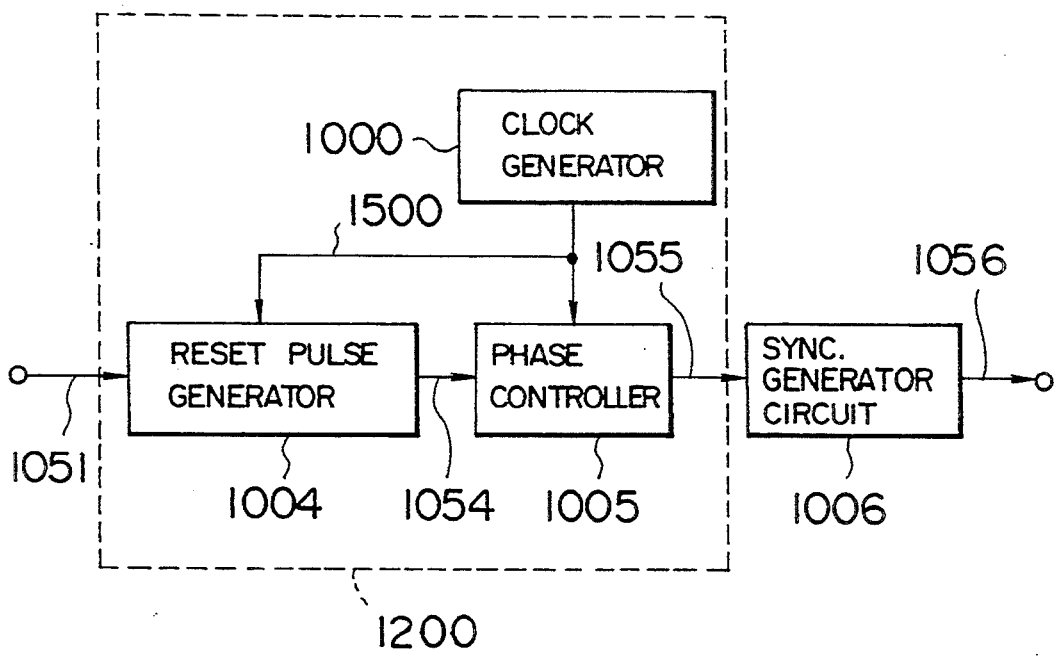
FIG. 18 is a block diagram showing further another embodiment of the invention.

FIG. 18 shows further another embodiment of the invention.

In FIG. 18, the parts and components having the same functions as those shown in FIG. 17 are designated by the same reference numerals.

The embodiment of FIG. 18 differs from the example of FIG. 17 with respect to a point that the periodicity decision circuit 1001 is omitted.

According to the embodiment, even in the case where the input sync signal 1051 drops out, the output signal 1055 of the reset pulse generator 1004 doesn't drop out, so that the stable output sync signal 1056 can be obtained.

Further, even if the phase of the input sync signal 1051 suddenly changes, the phase of the output sync signal 1056 doesn't suddenly change but slowly changes by the phase controller 1005, so that the stable output sync signal 1056 can be obtained.

Figure 19:
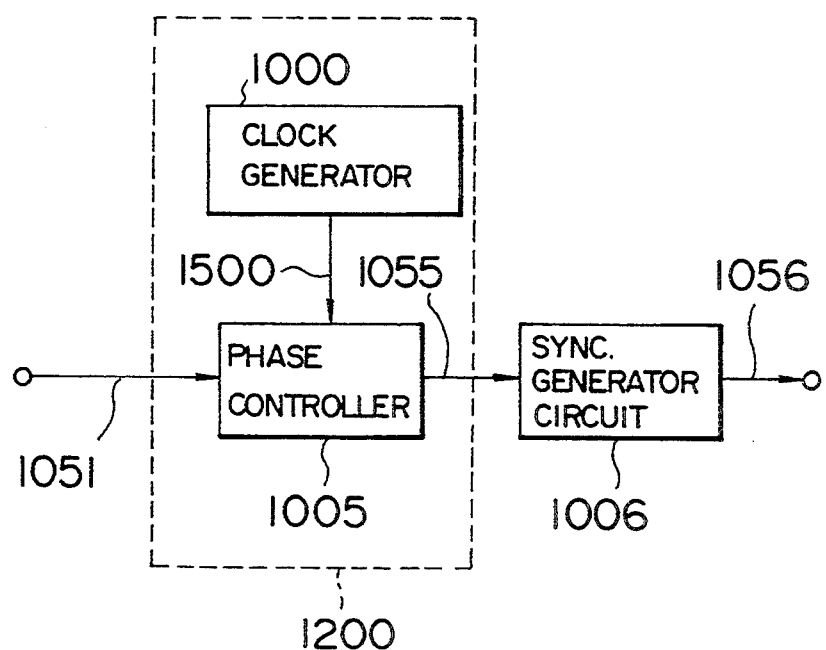
FIG. 19 is a block diagram showing further another embodiment of the invention.

FIG. 19 shows further another embodiment of the invention.

In FIG. 19, the parts and components having the same functions as those shown in FIG. 18 are designated by the same reference numerals.

The embodiment of FIG. 19 differs from the example of FIG. 18 with respect to a point that the reset pulse generator 1004 is omitted.

According to the embodiment, even if the phase of the input sync signal 1051 suddenly changes, the phase of the output sync signal 1056 doesn't suddenly change but slowly changes by the phase controller 1005, so that the stable output sync signal 1056 can be obtained.

According to the invention even if a noise component having no periodicity has been multiplexed to the input sync signal, the noise component can be eliminated by the periodicity decision circuit, so that the output sync signal can be stabilized.

On the other hand, even in the case where the input sync signal is deformed or drops out, if such a deformation or drop-out of the sync signal does not continuously occur an arbitrary set number of times or more, the phase of the output sync signal doesn't change. Therefore, the stability of the output sync signal can be raised.

Further, even if a deformation or drop-out of the input sync signal continuously occurs an arbitrary set number of times or more, the phase of the output sync signal doesn't suddenly change, so that the stability of the output sync signal can be raised.

What is claimed is:

1. A sync signal generator to generate a second sync signal synchronized with an inputted first sync signal, comprising:
    a phase reset signal detector for receiving the first sync signal and outputting a timing pulse whose phase fluctuation is smaller than a phase fluctuation of the first sync signal; and
    a sync generator for receiving the timing pulse and generating the second sync signal having the same phase as that of the timing pulse;
    wherein the phase reset signal detector comprises:
        a reference clock generator for independently generating a reference clock related to a standardized sync signal, and
        a phase controller responsive to the first sync signal and the reference clock for frequency dividing the reference clock into arbitrary periods such that a phase difference between the first sync signal and the said timing pulse is reduced by only an arbitrary set value for ones of said arbitrary periods during which a phase difference exists and for producing a timing pulse at a corresponding timing within each arbitrary period.

2. A sync signal generator according to claim 1, wherein the phase control of the phase controller to reduce the phase difference between the timing pulse as an output signal of the phase controller and the input signal of the phase controller by only the arbitrary set value is executed for an arbitrary period of time.

3. A sync signal generator for generating a second sync signal synchronized with an inputted first sync signal, comprising:
    a phase reset signal detector for receiving the first sync signal and outputting a timing pulse whose phase fluctuation is smaller than a phase fluctuation of the first sync signal; and
    a sync generator for receiving the timing pulse and generating the second sync signal having the same phase as that of the timing pulse;
    wherein the phase reset signal detector comprises:
        a reference clock generator for generating a reference clock,
        a reset pulse generator for receiving the first sync signal and the reference clock and outputting a reset pulse whose period is the same as that of a standardized sync signal which is produced form the reference clock and whose phase coincides with that of the first sync signal, and a phase controller responsive to the reset pulse and the reference clock for frequency dividing the reference clock into arbitrary periods such that a phase difference between the reset pulse and said timing pulse is reduced by only an arbitrary set value for ones of said arbitrary periods during which a phase difference exists and for producing a timing pulse at a corresponding timing within each arbitrary period.

4. A sync signal generator according to claim 3, wherein the phase control of the phase controller to reduce the phase difference between the timing pulse as an output signal of the phase controller and the input signal of the phase controller by only the arbitrary set value is executed for an arbitrary period of time.

5. A sync signal generator for generating a second sync signal synchronized with an inputted first sync signal, comprising:

- a phase reset signal detector for receiving the first sync signal and outputting a timing pulse whose phase fluctuation is smaller than a phase fluctuation of the first sync signal; and
- a sync generator for receiving the timing pulse and generating the second sync signal having the same phase as that of the timing pulse;
- wherein the phase reset signal detector comprises:
  - a reference clock generator for generating a reference clock,
  - a periodicity decision circuit for receiving the first sync signal and the reference clock and outputting a periodicity decision pulse in the case where a phase of the first sync signal coincides with a phase of a standardized sync signal which is formed from the reference clock,
  - a reset pulse generator for receiving the periodicity decision pulse and the reference clock and outputting a reset pulse whose phase coincides with that oaf the periodicity decision pulse and whose period is the same as that of the standardized sync signal which is formed from the reference clock, and
  - a phase controller responsive to the reset pulse and the reference clock for frequency dividing the reference clock into arbitrary periods such that a phase difference between the reset pulse and said timing pulse is reduced by only an arbitrary set value for ones of said arbitrary periods during which a phase difference exists and for producing a timing pulse at a corresponding timing within each arbitrary period.

6. A sync signal generator according to claim 5, wherein the phase control of the phase controller to reduce the phase difference between the timing pulse and an output signal of the phase controller and the input signal of the phase controller by only the arbitrary set value is executed for an arbitrary period of time.

7. A sync signal generator for generating a second sync signal synchronized with an inputted first sync signal, comprising;

- a phase reset signal detector for receiving the first sync signal and outputting a timing pulse whose phase fluctuation is smaller than a phase fluctuation of the first sync signal; and
- a sync generator for receiving the timing pulse and generating the second sync signal having the same phase as that of the timing pulse;
- wherein the phase reset signal detector comprises:
  - a reference clock generator for generating a reference clock,
  - a periodicity decision circuit for receiving the first sync signal and the reference clock and outputting a periodicity decision pulse in the case where a phase of the first sync signal coincides with a phase of a standardized sync signal which is formed from the reference clock, and for outputting a drop-out decision pulse in the case where said phases differ,
  - a drop-out permission circuit for receiving the drop-out decision pulse and producing an output signal in the case where drop-out decision pulses of an arbitrary set number or more are produced,
  - a continuity decision circuit for receiving the periodicity decision pulse and an output signal of the drop-out permission circuit, for counting the periodicity decision pulses, for outputting a pulse whose phase is matched with that of the periodicity decision pulse in the case where the count number is equal to or larger than an arbitrary set number, and for resetting the count number of the periodicity decision pulses in the case where the output signal of the drop-out permission circuit was input,
  - a reset pulse generator for receiving an output signal of the continuity decision circuit and the reference clock and outputting a reset pulse whose phase coincides with that of the output signal of the continuity decision circuit and whose period is the same as that of a standardized sync signal which is formed form the reference clock, and
  - a phase controller responsive to the reset pulse and the reference clock for frequency dividing the reference clock into arbitrary periods such that a phase difference between the reset pulse and said timing pulse is reduced by an arbitrary set value for ones of said arbitrary periods during a which phase difference exists and for producing a timing pulse at a corresponding timing within each arbitrary period.

8. A sync signal generator according to claim 7, wherein the phase control of the phase controller to reduce the phase difference between the timing pulse as an output signal of the phase controller and the input signal of the phase controller by only the arbitrary set value is executed for an arbitrary period of time.

9. A sync signal generator for generating a second sync signal synchronized with an inputted first sync signal, comprising:

- a phase reset signal detector for receiving the first sync signal and outputting a timing pulse whose phase fluctuation is smaller than a phase fluctuation of the first sync signal; and
- a sync generator for receiving the timing pulse and generating the second sync signal having the same phase as that of the timing pulse;
- wherein the phase reset signal detector comprises:
  - a reference clock generator for generating a reference clock,
  - a phase controller responsive to the first sync signal and the reference clock for frequency dividing the reference clock into arbitrary periods such that a phase difference between the first sync signal and the said timing pulse is reduced by only an arbitrary set value for ones of said arbitrary periods during which a phase difference exists and for producing a timing pulse at a corresponding timing within each arbitrary period;

wherein the first sync signal is a horizontal sync signal of a television signal and the phase control of the phase controller for reducing the phase difference between the timing pulse as an output signal of the phase controller and the input signal of the phase controller by only the arbitrary set value is executed for an arbitrary period of time within a vertical blanking period.

10. A sync signal generator according to claim 3, wherein the first sync signal is a horizontal sync signal of a television signal and the phase control of the phase controller for reducing the phase difference between the timing pulse as an output signal of the phase controller and the input signal of the phase controller by only the arbitrary set value is executed for an arbitrary period of time within a vertical blanking period.

11. A sync signal generator according to claim 5, wherein the first sync signal is a horizontal sync signal of a television signal and the phase control of the phase controller for reducing the phase difference between the timing pulse as an output signal of the phase controller and the input signal of the phase controller by only the arbitrary set value is executed for an arbitrary period of time within a vertical blanking period.

12. A syn signal generator according to claim 7, wherein the first sync signal is a horizontal sync signal of a television signal and the phase control of the phase controller for reducing the phase difference between the timing pulse as an output signal of the phase controller and the input signal of the phase controller by only the arbitrary set value is executed for an arbitrary period of time within a vertical blanking period.

13. A sync signal generator for generating a second sync signal synchronized with an inputted first sync signal, comprising:

a phase reset signal detector for receiving the first sync signal and outputting a timing pulse whose phase fluctuation is smaller than a phase fluctuation of the first sync signal; and a sync generator for receiving the timing pulse and generating the second sync signal having the same phase as that of the timing pulse;

wherein the phase reset signal detector comprises:
a reference clock generator for generating a reference clock,
a phase controller responsive to the first sync signal and the reference clock for frequency dividing the reference clock into arbitrary periods such that a phase difference between the first sync signal and the said timing pulse is reduced by only an arbitrary set value for ones of said arbitrary periods during which a phase difference exists and for producing a timing pulse at a corresponding timing within each arbitrary period;
wherein the phase controller comprises:
a counter for frequency dividing the reference clock which is input from the reference clock generator,
a latch for fetching a data train which is input from said counter at a timing of an output pulse of the reset pulse generator,
a reference value setting circuit for providing a set value,
a comparator for comparing the data fetched into the latch and data which is received from the reference value setting circuit,
a counter controller for controlling a frequency dividing ratio of the counter by an output signal of the comparator, and
an output pulse generator for decoding an arbitrary value of the data train which is input from the counter and generating an output value.

14. A sync signal generator according to claim 3, wherein the phase controller comprises:
a counter for frequency dividing the reference clock which is input from the reference clock generator;
a latch for fetching a data train which is input from said counter at a timing of an output pulse of the reset pulse generator;
a reference value setting circuit for providing a set value;
a comparator for comparing the data fetched into the latch and data which is received from the reference value setting circuit;
a counter controller for controlling a frequency dividing ratio of the counter by an output signal of the comparator; and
an output pulse generator for decoding an arbitrary value of the data train which is input from the counter and generating an output pulse.

15. A sync signal generator according to claim 5, wherein the phase controller comprises:
a counter for frequency dividing the reference clock which is input from the reference clock generator;
a latch for fetching a data train which is input from said counter at a timing of an output pulse of the reset pulse generator;
a reference value setting circuit for providing a set value;
a comparator for comparing the data fetched into the latch and data which is received from the reference value setting circuit;
a counter controller for controlling a frequency dividing a ratio of the counter by an output signal of the comparator; and
an output generator for decoding an arbitrary value of the data train which is input from the counter and generating an output pulse.

16. A sync signal generator according to claim 7, wherein the phase controller comprises:
a counter for frequency dividing the reference clock which is input from the reference clock generator;
a latch for fetching a data train which is input from said counter at a timing of an output pulse of the reset pulse generator;
a reference value setting circuit for providing a set value;
a comparator for comparing the data fetched into the latch and data which is received from the reference value setting circuit;
a counter controller for controlling a frequency dividing ratio of the counter by an output signal of the comparator; and
an output pulse generator for decoding an arbitrary value of the data train which is input from the counter and generating an output pulse.

17. A sync signal generator for generating a second horizontal sync signal and a second vertical sync signal which are synchronized with a first horizontal sync signal and a first vertical sync signal of an inputted television signal, comprising:
a reference clock generator for generating a reference clock;

a phase controller responsive to the first horizontal sync signal and the reference clock for frequency dividing said reference clock into arbitrary periods so that any phase difference between a reference signal obtained by the frequency dividing of said reference clock and the first horizontal sync signal is decreased by a set value in each arbitrary period during which a phase difference exists and for producing a timing pulse at a corresponding timing within each arbitrary period;

a horizontal sync generator for receiving the timing pulse and generating the second horizontal sync signal having the same phase as that of the timing pulse and a clock of a frequency which is an even-number times as high as a frequency of the second horizontal sync signal; and a vertical sync generator for receiving the first vertical sync signal and the output clock of the horizontal sync generator and frequency dividing the output clock of the horizontal sync generator and thereby outputting the second vertical sync signal having the same phase as that of the first vertical sync signal.

18. A sync signal generator for generating a second horizontal sync signal and a second vertical sync signal which are synchronized with a first horizontal sync signal and a first vertical sync signal of an inputted television signal, comprising:

a phase reset signal detector for receiving the first horizontal sync signal and outputting a timing pulse whose phase fluctuation is smaller than a phase fluctuation of the first horizontal sync signal;

a horizontal sync generator for receiving the timing pulse and generating the second horizontal sync signal having the same phase as that of the timing pulse and a clock of a frequence which is even-number times as high as a frequency of the second horizontal sync signal;

a vertical periodicity decision circuit for receiving the first vertical sync signal and the clock of the frequency which is even-number times as high as the frequency of the second horizontal sync signal, for outputting a periodicity decision pulse in the case where a phase of the first vertical sync signal coincides with a phase of a standardized vertical sync signal, and for outputting a drop-out decision pulse in the case where said phases differ;

a drop-out permission circuit for receiving the drop-out decision pulse and producing an output signal in the case where the drop-out decision pulses of an arbitrary set number or more continued;

a continuity decision circuit for receiving the periodicity decision pulse and an output signal of the drop-out permission circuit, for counting the periodicity decision pulses, for outputting a pulse whose phase is matched with a phase of the periodicity decision pulse in the case where the count number is equal to or larger than an arbitrary set number, and for resetting the count number of the periodicity decision pulses in the case where an output signal of the drop-out permission circuit is input; and a vertical sync generator for receiving an output signal of the continuity decision circuit and the clock of the frequency which is even-number times as high as the frequency of the second horizontal sync signal and frequency dividing the clock of the frequency which is even-number times as high as the frequency of the second horizontal sync signal and thereby outputting the second vertical sync signal having the same phase as a phase of an output pulse of the continuity decision circuit.

* * * * *